UNITED STATES PATENT OFFICE.

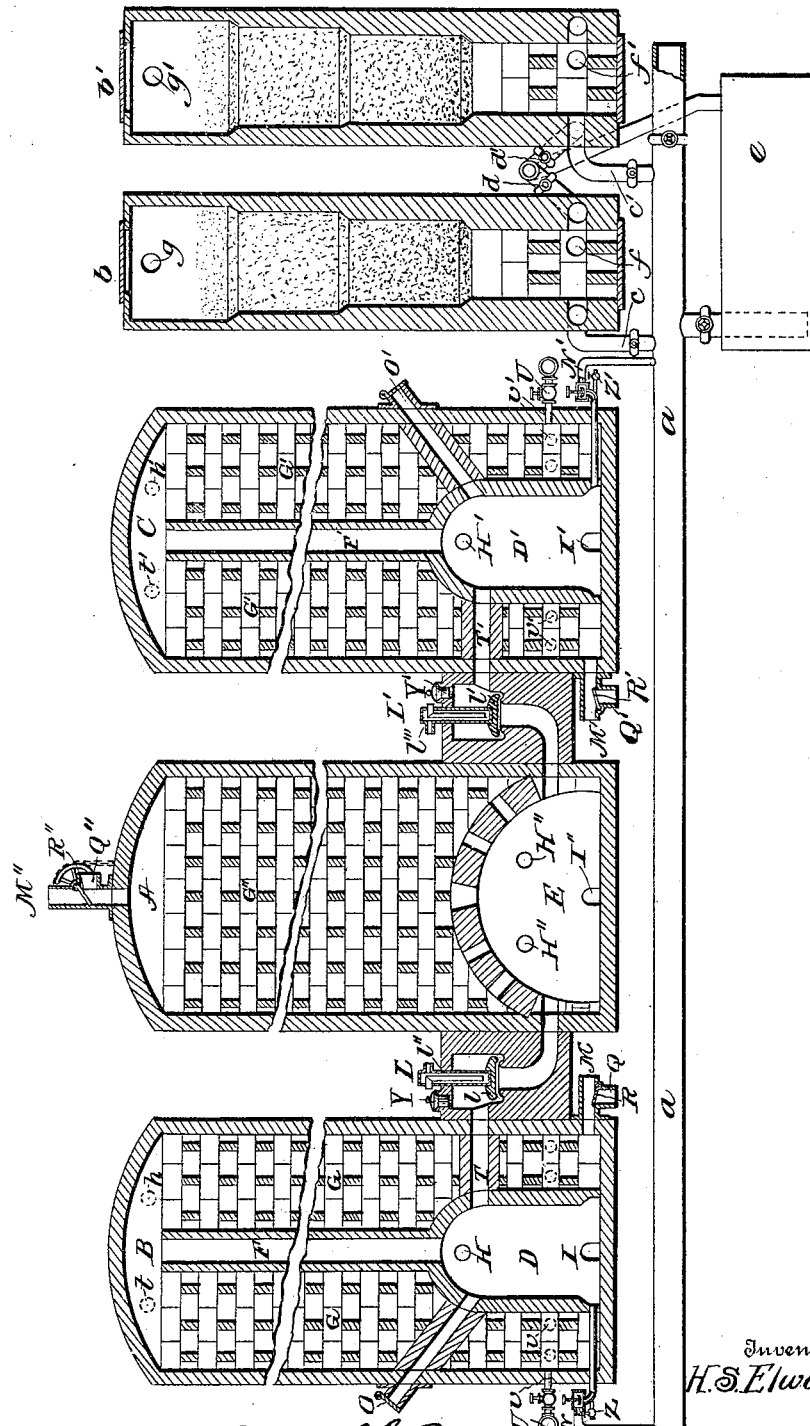

HERBERT SAMUEL ELWORTHY, OF LONDON, ENGLAND.

APPARATUS FOR MAKING PURE CARBONIC ACID.

SPECIFICATION forming part of Letters Patent No. 658,628, dated September 25, 1900.

Application filed May 3, 1900. Serial No. 15,397. (No model.)

*To all whom it may concern:*

Be it known that I, HERBERT SAMUEL ELWORTHY, a subject of the Queen of Great Britain, residing at London, England, have invented certain new and useful Improvements in Apparatus for Making Pure Carbonic Acid; and I do declare the following to be a full, clear, and exact description of the invention, such as will enable others skilled in the art to which it appertains to make and use the same.

This invention has reference more particularly to the manufacture by combustion of carbonic acid free from permanent gases, such as nitrogen, for the preparation of liquefied or solid carbonic acid, for the charging of beverages, and for other purposes to which such pure carbonic acid may be adapted; but each of the improvements constituting the invention is intended to be secured for all the uses to which it may be applicable.

In prior applications No. 663,049, filed December 22, 1897, for process, and No. 10,915, filed March 31, 1900, for apparatus, (the latter application being a division of the former,) I have described the manufacture of such carbonic acid by combustion, carbonic oxid being first formed by decomposing carbonic acid or steam or a mixture of carbonic acid and steam with a suitable form of carbon, and the so-obtained carbonic oxid being converted into carbonic acid by passage over suitable metallic oxid. In the decomposition of steam or of a mixture containing steam with carbon the carbonic oxid obtained is mixed with hydrogen from said steam; but this hydrogen can be oxidized to water-vapor at the same time that the carbonic oxid becomes converted into carbonic acid, and the so-formed water-vapor can be removed from the carbonic acid by condensation on cooling.

When necessary, (or whenever thought desirable,) the carbonic oxid before being converted into carbonic acid can be subjected to a scrubbing or washing or other purifying operation or operations calculated to remove ammoniacal or other impurities, and the carbonic acid can also be subjected to any desired purifying operation or operations—say, for example, the solution of the carbonic acid in water and a recovery of the same from such solution—in order thereby to insure its freedom from any non-condensible gas which from carelessness of the operator or from any cause may be liable to be present.

The present apparatus, like that of my said prior applications, consists in its entirety of a carbonic-oxid generator with regenerator-stoves containing inert material in combination with oxidizing-furnaces charged with suitable metallic oxid, with or without an intermediate condenser, scrubber, or other purifier, and with or without means for dissolving and recovering again the carbonic acid or for otherwise purifying the same; but in accordance with the present invention I have modified the carbonic-oxid generator, with its stoves and connections, in such manner as to obtain certain economies of working, the invention consisting in the new or improved carbonic-oxid generator itself, as well as in the combination thereof, with one or more oxidizing-furnaces with or without purifiers for the carbonic oxid and carbonic acid, (either or both.)

The invention also comprises the other parts, improvements, and combinations hereinafter set forth.

The accompanying drawing, which forms part of this specification, is a diagram of apparatus in accordance with the invention, said apparatus being shown mainly in vertical section.

There are two carbonic-oxid generators composed each of a carbon-chamber D or D' and a heating-chamber G or G', built in the same structure with and in close proximity to said carbon-chamber, so as to inclose the same on one or more sides and communicating therewith through the passage F or F' within said structure. Most advantageously the heating-chamber incloses the corresponding carbon-chamber on all sides except the bottom, as shown; but it might inclose it on the top only or on a vertical side or sides only and still be within the invention. Each heating-chamber is filled with inert material shown in the form of the ordinary open brickwork or checker-work of regenerator-stoves. This inert material (or brickwork) is raised to a high temperature, and then the oxidizing-gas in the form of carbonic acid or steam or a mixture of carbonic acid and steam (let in from the pipe U or U' through the valved branches v or v') is passed through the heating-chamber G or G' and the passage F or F' on its way to the carbon-chamber D or D', (filled to the proper level with coke or other suitable form of carbon,) wherein it is decomposed with the formation of carbonic oxid which escapes by the outlet N or N'. The carbon, say coke, can be supplied through the passage O or O'. By having the carbon-chamber inclosed by and communicating with the heating-chamber, as stated above, the oxidizing-gas can enter the carbon-chamber without the loss of temperature which would be incurred in the passage of so highly-heated a gas through an outside flue between the heating and carbon chambers, as shown in my before-mentioned applications. This inclosure and communication of the respective carbon-chambers D D' by and with the corresponding heating-chambers G G' can of course be secured without adopting everything exhibited in the drawing, and, in fact, the drawing exhibits additional improvements, one or more of which might even be used separately.

As shown, each carbon-chamber D or D' is surrounded by heating-flues composed, as shown, of the passages in the lower part of the brickwork of the corresponding heating-chamber G or G'. These heating-flues protect the said chamber against loss of heat by conduction through the walls of said carbon-chamber, and this protection is advantageously secured by having the heating-flues make part of a regenerator-stove, or, in other words, a heating-chamber filled with inert material belonging to the same apparatus, and best by having it make part, as shown, of the regenerator-stove or heating-chamber G or G', whereby the oxidizing-gas is heated on its way to said carbon-chamber D or D'. Further, the inlets T or T' and H or H' for, respectively, the air and gas, whereby the inert material (or brickwork) in each heating-chamber G or G' is brought to a very high temperature, instead of opening directly into said heating-chamber, as they could without exceeding the limits of the invention, open, as shown, into the upper part of the carbon-chamber D or D', so that the combustion for reheating takes place in the upper part of said chamber and the products pass thence through the passages F or F' to flow over the inert material therein and raise it to a suitably-high temperature before escaping by the outlet M or M' to a chimney. (Not shown.) This opening of the inlets for the air and reheating-gas, respectively, into the upper part of the carbon-chamber has certain advantages and is considered a special improvement. One advantage is that the walls of the upper part of the carbon-chamber (and also the upper part of the charge of carbon therein) are heated by the said combustion for reheating. Should the advantages of this special improvement not be desired, the inlets for the air and reheating-gas (one or both) could open directly into the heating-chamber, as indicated at $t\ h$ for the generator D G and at $t'\ h'$ for the generator D' G'.

In reheating the air employed and ordinarily also the fuel-gas would have such a nitrogen content as to render it undesirable for either of them or the products of the combustion of the fuel-gas by the air to penetrate the mass of carbonaceous matter in the carbon-chamber D or D'. This penetration is opposed by the gases or vapors already present within the said mass and might be practically prevented thereby; but, further, to insure against said penetration a gas-inlet Z or Z' is provided which opens into the lower part or carbon-space of the chamber D or D', so that a suitable volume of steam or carbonic acid or a mixture of them or other gas, (as carbonic oxid or hydrogen or mixture of them,) which would introduce no non-condensible non-combustible gas into said mass, can be let into the same. Such unobjectionable gas would pass through the mass of carbon and escape therefrom into the upper part or combustion-space of the carbon-chamber D or D', effectually preventing the passage downward of any nitrogen-holding gas.

As shown, the gas-inlet Z or Z' opens into the carbon-chamber D or D' not only at the same level, but also through the same passage as the carbonic-oxid outlet N or N'; but it is not necessary that it should enter by the same passage nor at the same level. It could enter at any other suitable point.

The intercommunication of the corresponding carbon and heating chambers D G or D' G' is not necessarily made by a passage between the upper parts of said chambers; but there is a certain advantage in such intercommunication, since it enables the products of the reheating combustion to pass downward through the heating-chamber, so that the greatest heat being at the top of said chamber the inert material (bricks) most highly heated, and consequently most apt to be softened by the intense heat, does not have to bear the weight of the superincumbent mass to which it would be subjected if the highest temperature were at the lower part of the heating-chamber, while at the same time the oxidizing-gas can pass through the said heating-chamber in the opposite direction to the products of the reheating combustion.

As shown, the upper part of the carbon-chamber D communicates with the upper part of the corresponding heating-chamber G through the passage F and the upper part of the carbon-chamber D' with the upper part of the heating-chamber G' (corresponding with it) through the passage F'. The air and gas for reheating enter by the inlets T H or T' H', so that the products of the reheating combustion pass into the upper part of the corresponding heating-chamber G or G' through the intermediate passage F or F', thence to descend through the said heating-chamber to the outlet M or M', leading, as beforesaid, to a chimney, (not shown,) and the oxidizing-gas entering by the inlets $v$ or $v'$ passes upward through the heating-chamber G or G' and (after becoming intensely heated) descends through the carbon in the chamber D or D' to become decomposed with the formation of carbonic oxid, (mixed or unmixed with hydrogen, according to the oxidizing-gas employed,) which passes away by the carbonic-oxid outlet N or N'. Should it be desired to utilize this improvement independently of the admission of the air and reheating-gas into the upper part of the carbon-chamber and with a consequent loss of the advantages attending such admission, one or both of the said inlets T H or T' H' can be replaced by an inlet or inlets, as is indicated in dotted lines at $t\,h$ or $t'\,h'$, opening directly into the upper end of the heating-chamber G or G'. So, too, this improvement, which is especially advantageous in a construction in which the carbon-chamber is inclosed by the heating-chamber, as before explained, can be utilized independently of said construction.

The duplicate carbonic-oxid generators D G and D' G' are connected by their carbonic-oxid outlets N N' with the flue $a$, (of which said outlets constitute valved branches,) leading to the duplicate oxidizing-furnaces $b\,b'$. Said flue $a$ can be connected directly or indirectly with said oxidizing-furnaces, so as to deliver the carbonic oxid (when of satisfactory purity) directly thereto or (when desired) after passage of said carbonic oxid through purifying apparatus of any desired kind or after storage for a greater or less time in a gasometer, there being in any of these cases valved branches for enabling the carbonic oxid to be supplied to either of said furnaces.

As shown, there is a valved branch $c$ or $c'$ for delivering the carbonic oxid to each oxidizing-furnace $b$ or $b'$ directly from the flue $a$ and an additional valved branch $d$ or $d'$ for delivering it thereto after the carbonic oxid shall have passed through a purifying apparatus, (indicated at $e$.) The inlet of this purifier is shown connected with the carbonic-oxid flue $a$ and its outlet with the valved branches $d\,d'$.

The furnaces $b\,b'$ are each charged with a metallic oxid, which can be reduced by carbonic oxid and then be readily reoxidized by passage of steam or air over the reduced metal. Refractory material (in lumps) coated or combined with copper oxid is recommended, the refractory material serving as a carrier for the copper oxid. At $f\,f'$ are the inlets for the reoxidizing air or steam or mixture thereof, and at $g\,g'$ passages for the escape of the carbonic acid and the products of the reoxidizing operation, each of the passages having branches (not shown) for furnishing separate outlets for the carbonic acid and said products, respectively.

In connection with the duplicate carbonic-oxid generators use is made of an air-heating chamber (or regenerator-stove) G'', which is filled with inert material (brickwork) and which communicates with the heating-chambers G G' of both of said generators through valved passages T and T', respectively, which form the air-inlets for said heating-chambers G G'. The air-heating chamber G'' is combined with each of the others in such a way that each of these can supply a hot blast to the chamber G'' or be supplied with a hot blast therefrom.

Each of the three heating-chambers has in addition to the air-inlet formed by the passage T or T' an air-inlet Q, Q', or Q'', controlled by a flap-valve R, R', or R'', (or by other suitable valves in place of or in addition to said flap-valve,) an outlet for the products of combustion M, M', or M'', also controlled by said flap-valve, (or by other suitable valves in place of or in addition to the same,) and an inlet H, H', or H'' for the reheating-gas. Two such inlets H' are shown for the stove-chamber G'', opening into the space E below the perforated dome at the bottom of said chamber. An air-inlet (in addition to the passages T T') could also open into said space E.

The valves L L' in the passages between the heating-chambers are best formed each of a disk $l$ or $l'$ (or body) of refractory brick and a stem $l''$ or $l'''$ of hollow metal cooled by a water circulation. As shown, a water-inlet pipe descends inside the hollow valve-stem nearly to the bottom thereof, and the outlet for the water is at the upper end of the said stem.

The chamber G'' is heated by the combustion of gas let in by either or both the inlets H''. It will suffice to use the so-called "producer-gas," which is made by the passage of air with or without a proportion of steam in contact with coke or other suitable form of carbon; but other gas or fuel can be used, if preferred, both here and for reheating the chambers G G'. The valve R'' being set to close the air-inlet Q'' and open the outlet M'' and fuel with air being admitted to the space E and ignited, combustion takes place and the products thereof pass off through and heat the inert material (brickwork) of the chamber (stove) G''. After a time, assuming that the chamber G is to be heated, the supply of fuel and air to the space E is stopped, the valve L is opened, (if not already open,) and the valves R R'' are so adjusted as to close the outlet M'' and open the outlet M, while opening the air-inlet Q'' and closing the air-inlet Q. Fuel (reheating-gas) being now admitted by the inlet H is lighted. The air which enters by the inlet Q'' descends through the chamber G'', becoming heated in its passage, and enters the upper part of the carbon-chamber D by the passage T, where it effects (or at least commences) the combustion of the reheating-gas, which is entering by the inlet H. The products of this reheating combustion go through the passage F to the upper part of the heating-chamber G and then descend over the inert material (brickwork) in said chamber to escape by the outlet M. The inert material of chamber G becomes heated, and when it is thought that the heating thereof has been long enough continued the delivery of the reheating-gas is shut off from the inlet H and returned to the inlets H'', and the valves R R'' are manipulated to open the air-inlet Q (while closing the outlet M) and to open the outlet M'', (while closing the air-inlet Q''.) By this manipulation the current through chambers G G'' is reversed, the air entering by the inlet Q passing through the chamber G and then through the chamber G'' to the outlet M''. In its passage through the chamber D it becomes highly heated and is delivered through the passage T as a hot blast to effect the combustion of the reheating-gas in the space E. Thus the inert material in the chamber G'' becomes still more highly heated, until it is time to reverse the current again. At each reversal the combustion is effected by a hotter blast, until at length it is judged that the chamber G has reached the heat desired.

For making pure carbonic acid it is not proper to admit air at intervals into the carbon for decomposing the oxidizing-gas (as is common in making ordinary water-gas) in order to supply the heat rendered latent by the decomposition of said oxidizing-gas and the formation of carbonic oxid; but it is important to raise the oxidizing-gas to so high a temperature as that it will itself furnish the heat thus rendered latent. Consequently the chamber G would be brought to a very high temperature before it would be ready for superheating the oxidizing-gas.

During the heating of the chamber G the entrance into the carbon in chamber D of nitrogen from the air or reheating-gas coming into the upper part of said chamber D by the inlets T and H, respectively, can be insured against by letting steam or other unobjectionable gas flow by the gas-inlet Z into the carbon-space of said chamber. Such gas would mingle with the products of the reheating combustion and pass off with them through the outlet M. When the desired temperature of chamber G has been reached, the passage T is closed, and also the inlet H for the reheating-gas. The outlet M for the products of combustion, the gas-inlet Z, and the air-inlet Q, and the inlets $v$ for the oxidizing-gas (steam or carbonic acid or a mixture of them) are opened. In order to allow the nitrogen-containing gas in the heating-chamber G to be removed, the gas may be allowed to escape for a time by the blow-off Y. (There is a corresponding blow-off Y for the generator D' G'.) This blow-off may be formed simply by a heavy cover. The oxidizing-gas passes upward through the inert material of the heating-chamber G, then by way of the passage F into the upper part of the carbon-chamber D, and then out by the blow-off Y. When there is no longer nitrogen in the chamber G, (or if the nitrogen is to be disregarded,) then as soon as the heating-chamber G has been raised to the proper temperature the carbonic-oxid outlet N is opened and the hot oxidizing-gas passes downward through the carbon (coke, say) in the carbon-chamber, becoming decomposed with the formation of carbonic oxid, which passes off by its outlet N into the flue $a$. This flue delivers it by one of its branches to one of the oxidizing-furnaces $b\ c$ with or without having caused it to pass through a purifying apparatus or a gasometer, according to the mode of working. In the furnace the carbonic oxid abstracts oxygen from the metallic oxid, becoming converted into carbonic acid, which passes off to be utilized as may be desired.

While the carbonic-oxid generator D G is serving to generate carbonic oxid the heating-chamber G' of the other generator D' G' can be having its temperature raised by the aid of the chamber G'', the current through the chambers G' G'' being reversed from time to time, as before described, for the chamber G. Then when the temperature of the chamber G shall be lowered by the operation of heating the oxidizing-gas it can be reheated, while the generator D' D' is used to supply carbonic oxid to the flue $a$.

When the metallic oxid in one of the furnaces $b\ c$ becomes reduced as much as may be thought expedient, the supply of carbonic oxid can be cut off, and the metal can be reoxidized by the admission thereinto of steam or air or a mixture of steam or air, the formation of carbonic acid being meantime carried on in the other furnace.

Ordinarily the carbon-chamber D or D' would be charged with solid carbon, (or coke,) which can be supplied by the charging-passage O O'; but it could be otherwise adapted for serving as the chamber wherein the decomposition of the oxidizing-gas is effected. One way for effecting this would be to fill it with inert material and to admit hydrocarbon or powdered carbon or the like into said chamber.

At the points I, I', and I'' are doors (to be closed in operation) for giving access on occasion to the chambers D D' and space E for the removal of ashes or for other purpose.

Thus far the operation has been described for the manufacture of carbonic oxid and carbonic acid free from non-condensable non-combustible gas, (such as nitrogen,) except that it has been said that the heating-chamber G or G' need not be cleared of the products of the reheating combustion preliminary to the passage of the oxidizing-gas through the carbon-chamber if the amount of nitrogen, which might otherwise get into the carbonic oxid can be disregarded. This might be because the so-formed carbonic acid could be utilized either directly or after purification.

For some purposes—as for making white lead, for example—a specially-pure carbonic acid is not required, and the solution of the carbonic acid in water with recovery of it therefrom tends to eliminate nitrogen from said acid. Further, the apparatus described or a suitable portion thereof can be worked with heat derived in whole or in part from the combustion of the carbon in the carbon-chamber D or D'. Thus along with the introduction of reheating-gas by the reheating-gas inlet H or H' air or a mixture of steam and air can be let in through the gas-inlet Z or Z', so as to pass up through the carbon in said chamber D or D' and by reaction with said carbon produce gas whose combustion by air (from the passage T T') would aid in reheating, or where this latter source of reheating-gas should suffice the supply by the inlet H or H' for reheating-gas could be cut off and, if desired, the said inlet H or H' could be suppressed. It is considered preferable, however, apart even from the question of the contamination by nitrogen of the carbonic oxid, to derive the heat from reheating-gas made otherwise than from the carbon of the carbon-chamber D or D', because it is advantageous to form the carbonic oxid by means of carbon of a high grade and practically free from sulfur, whereas inferior fuel can be burned in an ordinary gas-producer for the production of a satisfactory reheating-gas.

In the hereinafter-written claims, wherein inlets and outlets, as explained, are set forth, it will be understood that it is intended to include either or both of the inlets herein called, respectively, the inlet H or H', or it may be $h$ or $h'$, or also H and $h$ or H' and $h'$ for the reheating-gas and the gas-inlet Z or Z' opening into the carbon-space of the carbon-chamber D or D', for, as already explained, the inlet for the reheating-gas can be suppressed if the gas-inlet opening into the carbon-space be used for the admission of air or a combustible gas, and the latter inlet can be suppressed if the inlet for reheating-gas be used, or the gas-inlet opening into the carbon-space can be used to admit nitrogen-free gas or air or a nitrogen containing combustible gas or any two or more of them in connection with the use of the inlet for reheating-gas.

I claim as my invention or discovery—

1. A carbonic-oxid generator, composed of a carbon-chamber having a carbonic-oxid outlet, and a heating-chamber communicating with said carbon-chamber and filled with inert material, said heating-chamber having inlets for air and reheating-gas, respectively, both opening into the upper part of said carbon-chamber and being further provided with an inlet for the oxidizing-gas and an outlet for the products of the reheating combustion, substantially as described.

2. A carbonic-oxid generator, composed of a carbon-chamber having a gas-inlet opening into its carbon-space and a carbonic-oxid outlet, and a heating-chamber communicating with said carbon-chamber and filled with inert material, said heating-chamber having inlets for air and reheating-gas, respectively, both opening into the upper part of said carbon-chamber and being further provided with an inlet for the oxidizing-gas and an outlet for the products of the reheating combustion, substantially as described.

3. A carbonic-oxid generator, composed of a carbon-chamber having a carbonic-oxid outlet at the bottom, and a heating-chamber filled with inert material and communicating with said carbon-chamber by a passage intermediate the upper parts of said chambers, said heating-chamber being provided with inlets for air and reheating-gas, respectively, opening into the upper part of said carbon-chamber and an outlet for the products of combustion at the lower part of said heating-chamber and an inlet for the oxidizing-gas at its lower part also, substantially as described.

4. An apparatus for generating carbonic acid, composed of duplicate carbonic-oxid generators, each embodying a carbon-chamber and a heating-chamber inclosing said carbon-chamber and communicating therewith, duplicate oxidizing-furnaces charged with metallic oxid, a flue with valved branches between the carbonic-oxid outlets of said generators and the inlets of said oxidizing-furnaces, and an air-heating chamber communicating by valved passages with the heating-chambers of both said generators, each of the three said heating-chambers being filled with inert material and being provided with inlets and outlets as explained, including an individual outlet for the products of combustion from each and an inlet for the oxidizing-gas for each of those which form part of a carbonic-oxid generator, all substantially as described.

5. An apparatus for generating carbonic oxid, composed of duplicate carbonic-oxid generators, each embodying a carbon-chamber and a heating-chamber inclosing said carbon-chamber and communicating therewith, and an air-heating chamber communicating by valved passages with the heating-chambers of both said generators, each of the three said heating-chambers being filled with inert material and being provided with inlets and outlets as explained, including an individual outlet for the products of combustion from each and an inlet for the oxidizing-gas for each of those which form part of a carbonic-oxid generator, all substantially as described.

6. An apparatus for generating carbonic oxid, composed of a carbon-chamber, a heating-chamber inclosing said carbon-chamber and communicating therewith, and an additional heating-chamber connected by a valved passage with the former, said heating-chambers being filled with inert material and being provided with inlets and outlets as explained, including an individual outlet for the products of combustion from each and an inlet for the oxidizing-gas for each of those which form part of a carbonic-oxid generator, all substantially as described.

7. An apparatus for generating carbonic oxid, composed of a carbon-chamber, and two heating-chambers which communicate with each other through the upper part of said carbon-chamber, said chambers being provided with inlets and outlets as explained, all substantially as described.

8. An apparatus for generating carbonic oxid, composed of a carbon-chamber, a heating-chamber inclosing said carbon-chamber and communicating therewith by a passage between the upper parts of said chambers, and a second heating-chamber connected with the former by a valved passage, said heating-chambers being filled with inert material and having each its individual outlet for products of combustion and other inlets and outlets as explained, all substantially as described.

9. A carbonic-oxid generator, composed of a carbon-chamber having a gas-inlet opening into its carbon-space and a carbonic-oxid outlet, and a heating-chamber inclosing said carbon-chamber and communicating therewith, the said heating-chamber being filled with inert material and being provided with an air-inlet opening into the upper part of said carbon-chamber and an outlet for the products of combustion and also with an inlet for the oxidizing-gas, substantially as described.

10. A carbonic-oxid generator, composed of a carbon-chamber having a gas-inlet opening into its carbon-space and a carbonic-oxid outlet, and a heating-chamber filled with inert material and communicating with said carbon-chamber by a passage intermediate the upper parts of said chambers, said heating-chambers being provided with an air-inlet and an outlet for the products of combustion arranged for the passage of said products downward through said heating-chamber and with an inlet at its lower part for the introduction of the oxidizing-gas so that it can pass upward in said heating-chamber, substantially as described.

11. A carbonic-oxid generator, composed of a carbon-chamber having a gas-inlet opening into its carbon-space and a carbonic-oxid outlet, and a heating-chamber filled with inert material and communicating with said carbon-chamber by a passage intermediate the upper parts of said chambers, said heating-chambers being provided with an air-inlet opening into the upper part of said carbon-chamber and an outlet for the products of combustion at the lower part of said heating-chamber, and an inlet for the oxidizing-gas at its lower part also, substantially as described.

12. A carbonic-oxid generator, composed of a carbon-chamber having a gas-inlet opening into its carbon-space and a carbonic-oxid outlet, and a heating-chamber inclosing said carbon-chamber and communicating therewith by a passage intermediate the upper parts of said chambers, said heating-chamber being filled with inert material and being provided with an air-inlet, and an outlet for the products of combustion arranged for the passage of said products downward through said heating-chamber and with an inlet at its lower part for the introduction of the oxidizing-gas so that it can pass upward in said heating-chamber, substantially as described.

13. An apparatus for generating carbonic oxid, composed of a carbon-chamber having a gas-inlet opening into its carbon-space and a carbonic-oxid outlet, a heating-chamber filled with inert material and communicating therewith, and another heating-chamber also filled with inert material and communicating by a valved passage with the first-mentioned heating-chamber, the last-mentioned heating-chamber being provided with means whereby the inert material can be heated and air can be introduced into the same for delivery to said first-mentioned heating-chamber, and said first-mentioned heating-chamber having an inlet for the oxidizing-gas and an air-inlet whereby air can be introduced for delivery to the other heating-chamber, substantially as described.

In testimony whereof I have hereunto set my hand in presence of two subscribing witnesses.

HERBERT SAMUEL ELWORTHY.

Witnesses:
A. NUTTING,
J. O'DONNELL.